(12) United States Patent
Koh et al.

(10) Patent No.: US 6,527,437 B1
(45) Date of Patent: Mar. 4, 2003

(54) SYSTEM AND METHOD FOR CALIBRATING A THERMOCOUPLE SENSOR

(75) Inventors: Hock Chuan Koh, Singapore (SG);
Kah Shan Chen, Singapore (SG);
Justin Valentino Ajmer, Singapore (SG)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/688,751

(22) Filed: Oct. 16, 2000

(51) Int. Cl.[7] .............................. G01K 15/00; G01K 1/14
(52) U.S. Cl. ............................................ 371/1; 324/179
(58) Field of Search ............................. 374/1, 179, 208

(56) References Cited

U.S. PATENT DOCUMENTS

| | | | | |
|---|---|---|---|---|
| 3,464,864 A | * | 9/1969 | Rentz | 374/179 |
| 3,983,753 A | * | 10/1976 | Greenleaf et al. | 73/343 R |
| 4,553,852 A | * | 11/1985 | Derderian et al. | 374/1 |
| 4,878,016 A | * | 10/1989 | Wahl et al. | 374/142 |
| 5,176,451 A | * | 1/1993 | Sasada et al. | 374/179 |
| 6,062,728 A | * | 5/2000 | Breunsbach et al. | 374/142 |
| 6,257,758 B1 | * | 7/2001 | Culbertson | 374/179 |
| 6,331,683 B1 | * | 12/2001 | Spannagel et al. | 374/1 |
| 6,334,707 B1 | * | 1/2002 | Ku | 374/208 |
| 6,338,571 B1 | * | 1/2002 | Chen | 374/208 |

FOREIGN PATENT DOCUMENTS

FR          2694083 A1   *  1/1994  .................. 374/163

* cited by examiner

*Primary Examiner*—Diego Gutierrez
*Assistant Examiner*—Mirellys Jagan
(74) *Attorney, Agent, or Firm*—Foley & Lardner

(57) ABSTRACT

A jig assembly for use in calibrating a thermocouple sensor includes a conductive member, a holder, and a fastener. The conductive member has a recess configured to receive a test wire and a test surface configured for thermal contact with the thermocouple sensor. The holder is adapted to receive the conductive member. The fastener is coupleable to the holder, wherein the holder and fastener form a recess configured to receive the test wire.

20 Claims, 10 Drawing Sheets

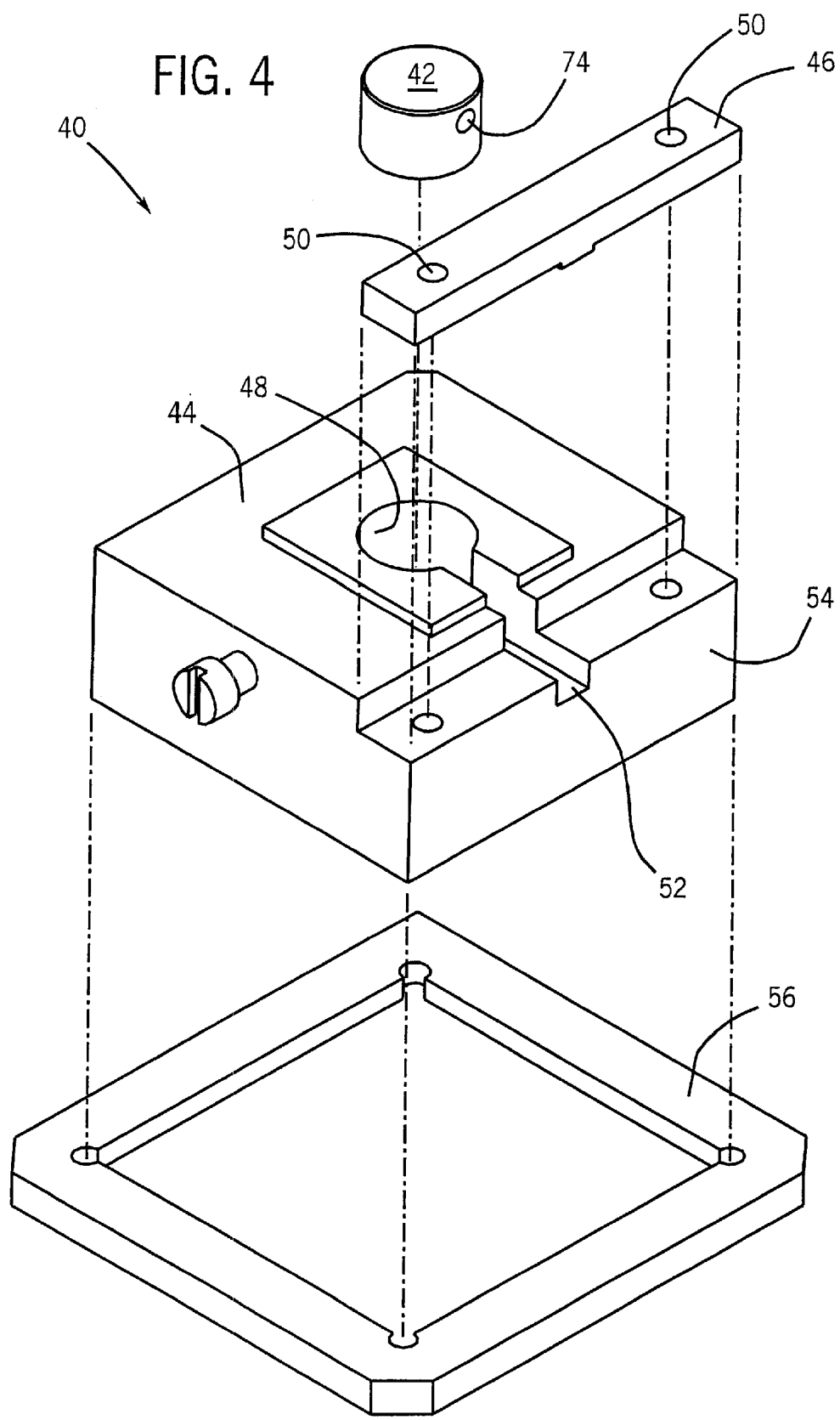

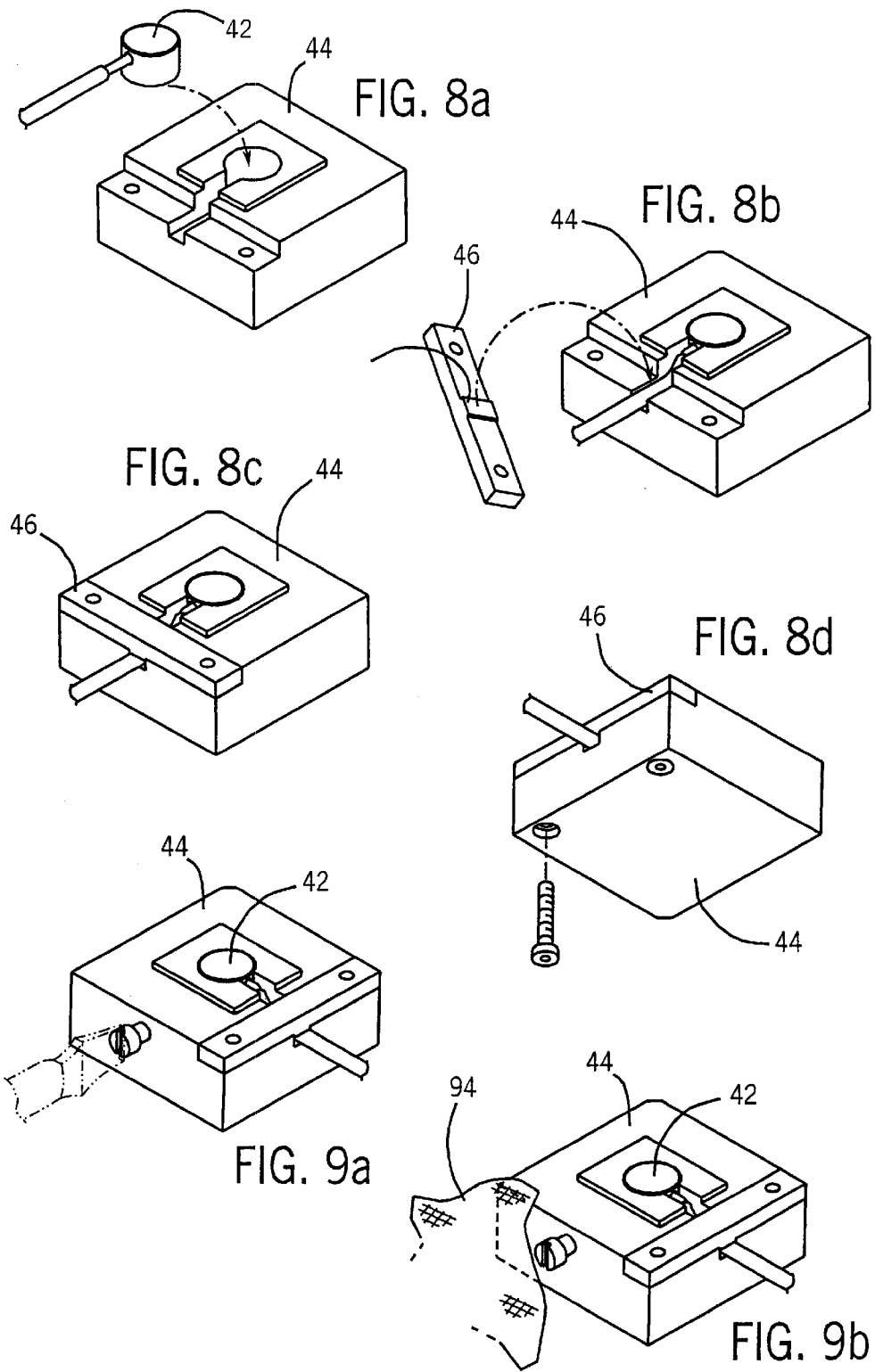

SYSTEM AND METHOD FOR CALIBRATING A THERMOCOUPLE SENSOR

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates generally to systems and methods for calibrating a thermocouple sensor. More specifically, the present invention relates to systems and methods for testing a thermocouple sensor used for testing integrated circuits.

BACKGROUND OF THE INVENTION

Thermal control is a critical consideration in any microelectronics design process. One problem relating to thermal control is device failure. Studies have shown that element-related functional failures exhibit a strong relationship to operating temperature. For example, a 10–20 degree Celsius increase in chip temperature may double the element failure rate under some conditions. Another problem related to thermal control is the variability of the package temperature and corresponding variability in performance. Thermal designs seek to reduce the temperature variations within the package for consistent and reliable performance. For example, complementary metal-oxide semiconductor (CMOS) circuit speed is dependent on temperature. Thus, an increase or decrease in temperature may affect cycle times or timing margins.

The thermal characteristics of an integrated circuit, such as a microprocessor, must be tested repeatedly, both during the design phase and during manufacturing. One such testing device includes a test pad, a test control circuit, a movable armature, and a thermal head coupled to the armature. An integrated circuit to be tested is placed on the test pad. The test pad includes conductors which electrically couple contacts on the integrated circuit with the test control circuit. The moveable armature moves downward and brings a thermocouple sensor on the thermal head in contact with the packaging of the integrated circuit. The thermal head provides controlled temperatures to the integrated circuit while monitoring the temperature of the integrated circuit through the thermocouple sensor.

The accuracy of the thermocouple sensor is very important in this testing operation. Therefore, the thermocouple sensor is calibrated when the sensor is first used, and thereafter during preventive maintenance, to ensure the accuracy of the sensor during integrated circuit testing.

Calibration of the thermocouple sensor is a tedious process because the sensor must be dismounted from the thermal head. This requires unscrewing multiple screws to unclamp the thermocouple sensor, removing an aluminum clamp using a tweezers, and pulling the thermocouple wire out of the thermal head-all without damaging the thermocouple sensor. Thereafter, the sensor is sent to a calibration laboratory for calibration. After calibrating the sensor, it must be re-mounted to the thermal head. The entire calibration process can take 1 to 2 days to complete, which results in unacceptably long downtime for the testing device. The removal and re-mounting of the thermocouple sensor also requires skilled labor, thereby increasing overhead costs.

Accordingly, there is a need for a simple and yet effective system and method for calibrating a thermocouple sensor. Further, there is a need for a system and method for calibrating a thermocouple sensor that does not result in significant down time for the testing device. Further still, there is a need for a system and method for calibrating a thermocouple sensor without removing it from the thermal head. Further still, there is a need for reducing human finger and wrist fatigue when calibrating a thermocouple sensor.

SUMMARY OF THE INVENTION

According to an exemplary embodiment, a jig assembly for use in calibrating a thermocouple sensor includes a conductive member, a holder, and a fastener. The conductive member has a recess configured to receive a test wire and a test surface configured for thermal contact with the thermocouple sensor. The holder is adapted to receive the conductive member. The fastener is coupleable to the holder, wherein the holder and fastener form a recess configured to receive the test wire.

According to another exemplary embodiment, a method of calibrating a thermocouple sensor on a test device is provided. The test device has a test pad. The method includes placing a jig on a test pad. The jig includes a base portion, a conductive portion, and a test wire coupled to the conductive portion. The method further includes bringing the thermocouple sensor in thermal contact with the conductive portion. The method further includes performing a calibration routine on the thermocouple sensor.

According to yet another exemplary embodiment, a system for calibrating a thermocouple sensor coupled to a test device includes a means for sensing the temperature of the thermocouple sensor and a means for positioning the means for sensing on a test pad of the test device.

BRIEF DESCRIPTION OF THE DRAWINGS

The invention will become more fully understood from the following detailed description, taken in conjunction with the accompanying drawings, wherein like reference numerals refer to like parts, in which:

FIG. 4 is an exploded view of the jig assembly of FIG. 3;

FIGS. 7a–7c, 8a–8d, and 9a–9b are drawings of steps for assembling the jig assembly of FIG. 3 according to an exemplary embodiment;

DETAILED DESCRIPTION OF EXEMPLARY EMBODIMENTS

Figure 1:
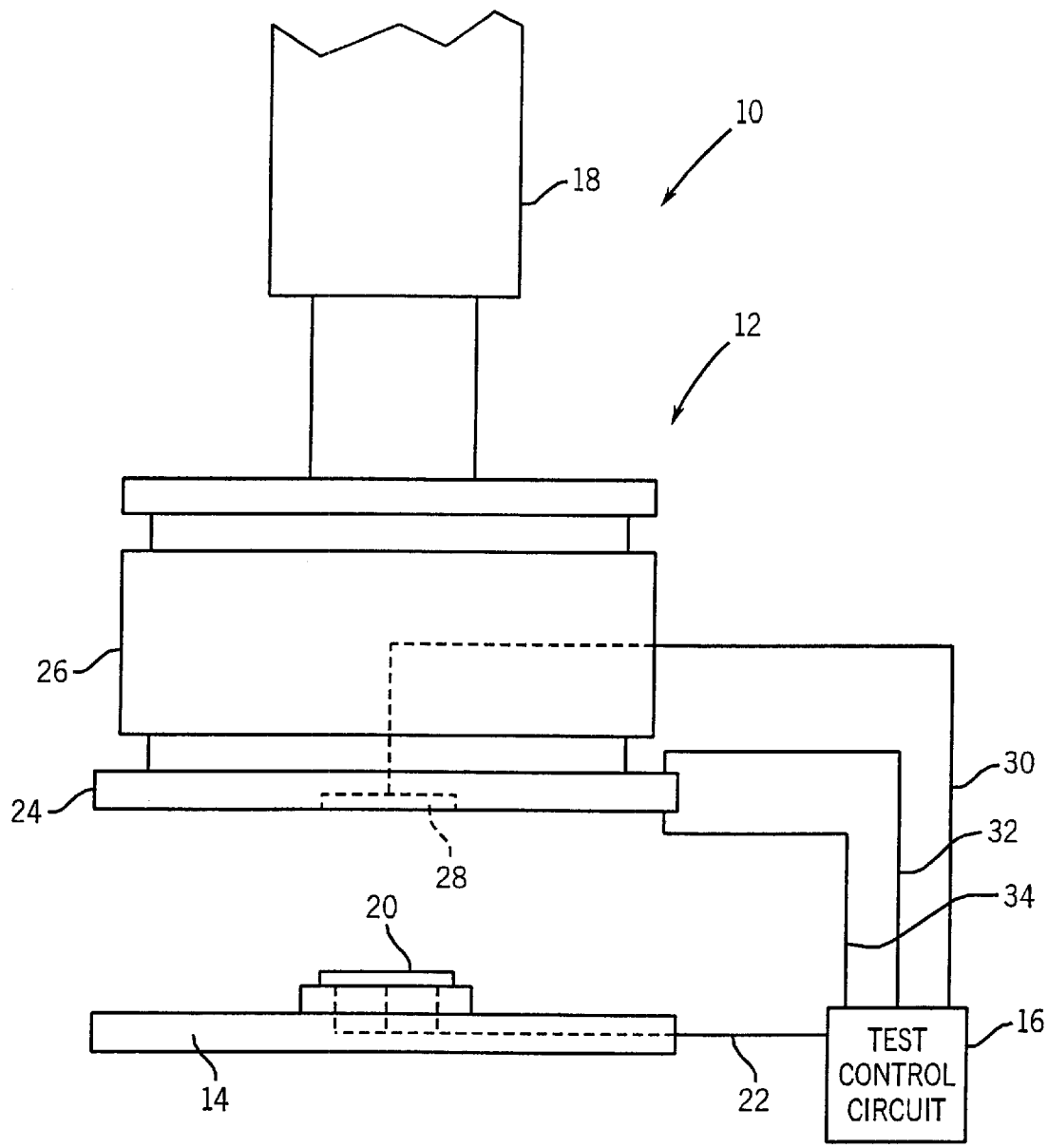
FIG. 1 is a schematic diagram of a test device for testing integrated circuits according to an exemplary embodiment.

Referring first to FIG. 1, a test device 10 according to an exemplary embodiment is illustrated. Test device 10 includes a thermal head 12, a test pad 14, a test control circuit 16, and an actuator 18. Test device 10 is used to test an integrated circuit 20 (e.g., a microprocessor, a memory circuit, an optical circuit, etc.) by applying command signals to various pins of integrated circuit 20 via bus 22 and receiving test result signals from integrated circuit 20 via bus 22.

In this exemplary device, the temperature of integrated circuit 20 is controlled during the test procedure by test control circuit 16. Thermal head 12 includes a thermoelectric cooler 24, a water jacket 26, and a thermocouple sensor 28. Thermoelectric cooler 24 may include any type of cooling system (e.g., active or passive systems). In this exemplary embodiment a Peltier-effect device is utilized. A Peltier-effect device includes two ceramic substrates with doped P-type and N-type semiconductive material (e.g., bismuth telluride) connected electrically in series and thermally in parallel between the ceramic substrates. As current flows in series through the semiconductive materials, one ceramic substrate will become hotter than ambient temperature and the other ceramic substrate will become colder than ambient temperature.

One side of thermoelectric cooler 24 is in thermal contact with water jacket 26. Water jacket 26 is a water cooled portion of thermal head 12 which is designed to cool one side of thermoelectric cooler 24. Thermocouple sensor 28 is configured to contact integrated circuit 20 when actuator 18 is extended. A thermocouple sensor is a thermoelectric device used to measure temperatures accurately, and may include two dissimilar metals joined so that a potential difference generated between the points of contact is a measure of the temperature difference between the points. Test control circuit 16 is coupled to thermoelectric cooler 24 via a bus or wire 30. Test control circuit 16 is also coupled to thermoelectric cooler 24 via wires 32 and 34.

During testing, actuator 18 (e.g., a pneumatic actuator, hydraulic actuator, electric motor, etc.) moves thermal head 12 downward until thermoelectric cooler 24 and/or thermocouple sensor 28 are in thermal contact with integrated circuit 20. Test control circuit 16 then applies a current through thermoelectric cooler 24 via wires 32 and 34. Thermoelectric cooler 24, in response, creates a cold side and a hot side to control the testing temperature of integrated circuit 20. Test control circuit 16 monitors a signal on bus 30 representative of the temperature sensed by thermocouple sensor 28 from integrated circuit 20 and utilizes this signal as a feedback signal to control the surface temperature of integrated circuit 20 to a predetermined value or values. In this exemplary embodiment, thermocouple sensor 28 includes a "T"-type thermocouple sensor, though other types of thermocouple sensors may be used. In this exemplary embodiment, a proportional-integral-derivative (PID) algorithm is operable in test control circuit 16 to control the temperature of integrated circuit 20 using the feedback signal from thermocouple sensor 28. As is evident from this example, the accuracy of thermocouple sensor 28 is critical during this testing operation.

Figure 2:
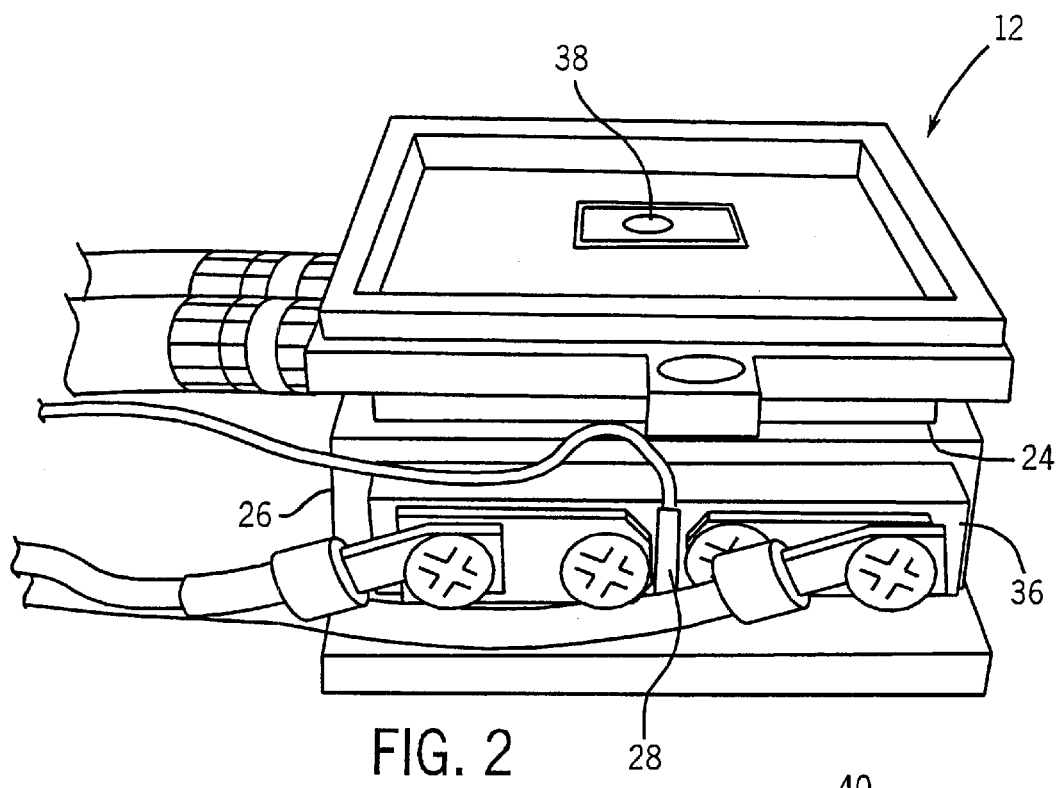
FIG. 2 is a drawing of a thermal head according to an exemplary embodiment.

Referring now to FIG. 2, a diagram of an exemplary thermal head 12 is shown. The diagram is shown upside down relative to the way thermal head 12 is illustrated in FIG. 1. FIG. 2 illustrates the relative configurations of the various components of thermal head 12. Water jacket 26 is coupled to a terminal block 36 which may be mounted to actuator 18. Thermoelectric cooler 24 is coupled to water jacket 26. Thermocouple sensor 28 enters from a side wall of thermal head 12 and makes an electrical connection with a clamp 38 (e.g., an aluminum clamp).

Figure 3:
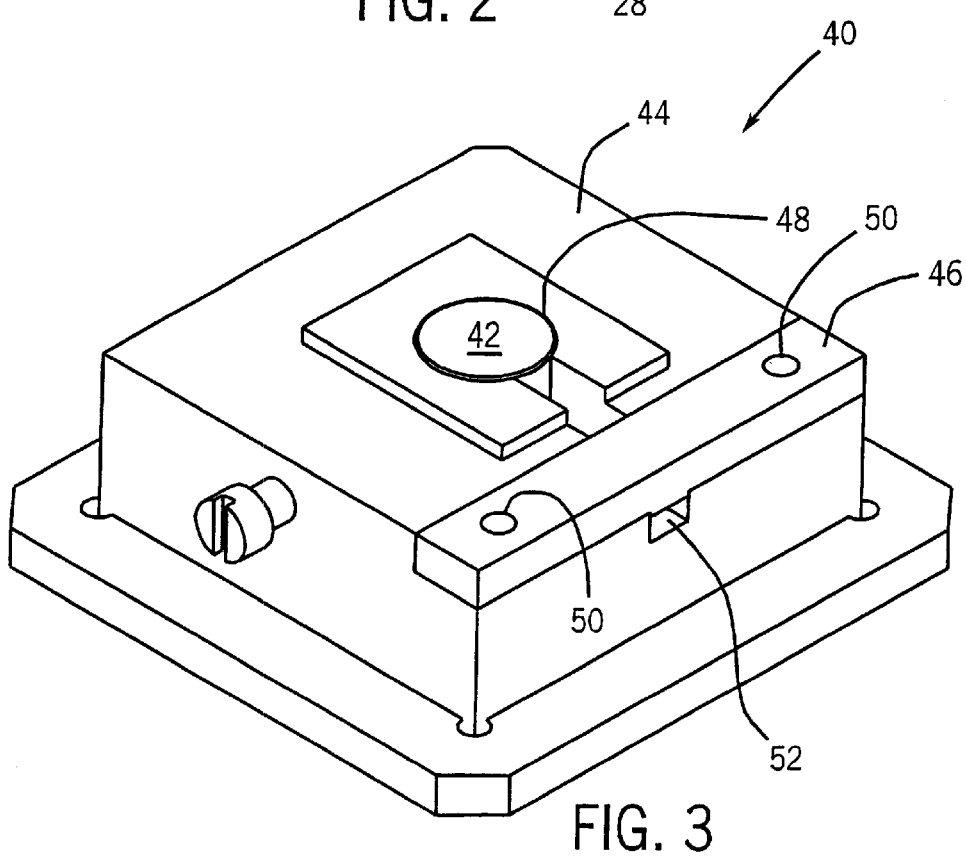
FIG. 3 is a drawing of a perspective view of a jig assembly according to an exemplary embodiment.

Referring now to FIG. 3, a jig assembly 40 for use in calibrating thermocouple sensor 28 is illustrated. A jig is simply a device used to maintain a positional relationship between two parts of an assembly. Thus, jig assembly 40 may take many forms other than the exemplary form illustrated. Jig assembly 40 includes a conductive member 42, a holder 44 for conductive member 42, and a fastener 46. Conductive member 42 is a disc made from copper in this exemplary embodiment. Copper provides superior thermal conductivity. As will be seen, a thermocouple sensor will be mounted to conductive member 42 for sensing the temperature of thermal head 12. Conductive member 42 may alternatively be square-shaped, triangular, or other geometric shapes. Holder 44 includes a recess 48 adapted to receive conductive member 42. Accordingly, recess 48 may be any geometric shape suitable for receiving conductive member 42. Holder 44 holds conductive member 42 in the center position of holder 44 in this exemplary embodiment. However, conductive member 42 may be in any position that brings conductive member 42 into thermal contact with thermocouple sensor 28 during calibration. Holder 44 comprises stainless steel for its anti-corrosion and low thermal conductivity. Fastener 46 is coupleable to holder 44 via apertures 50 suitable for receiving screws or other fastening devices (e.g., welds, clamps, etc.). Fastener 46 and holder 44 form a recess 52 which is large enough to receive a test thermocouple wire (not shown). Advantageously, fastener 46 and holder 44 apply a holding pressure to the test thermocouple wire when fastener 46 is secured in place.

Referring now to FIG. 4, additional characteristics of jig assembly 40 will now be described. Jig assembly 40 includes a base portion 54 (e.g., a bottom) having a square-shaped configuration in this exemplary embodiment. Base portion 54 is of the necessary configuration for mounting to any type of test pad for an integrated circuit testing machine, such as test device 10. An adapter plate 56 may be used to adapt base portion 54 to other test pad configurations so that jig assembly 40 may be used with multiple integrated circuit testing machines. For example, base portion 54 is suitable for use with a test pad configured to test an Athlon LGA (land grid array) package, and adapter plate 56 configures jig assembly 40 for use with an Athlon PGA (pin grid array) package both microprocessors being manufactured by Advanced Micro Devices, Sunnyvale, Calif.

Figure 5A:
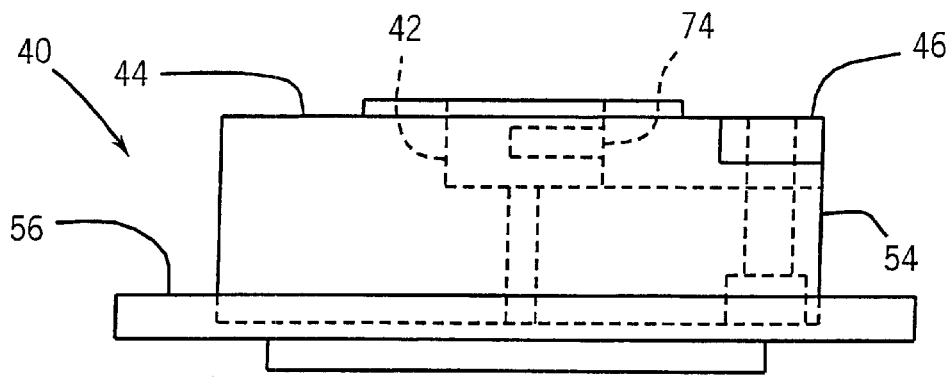
FIGS. 5a–5b show drawings of top and front views of the jig assembly of FIG. 3.
Figure 5B:
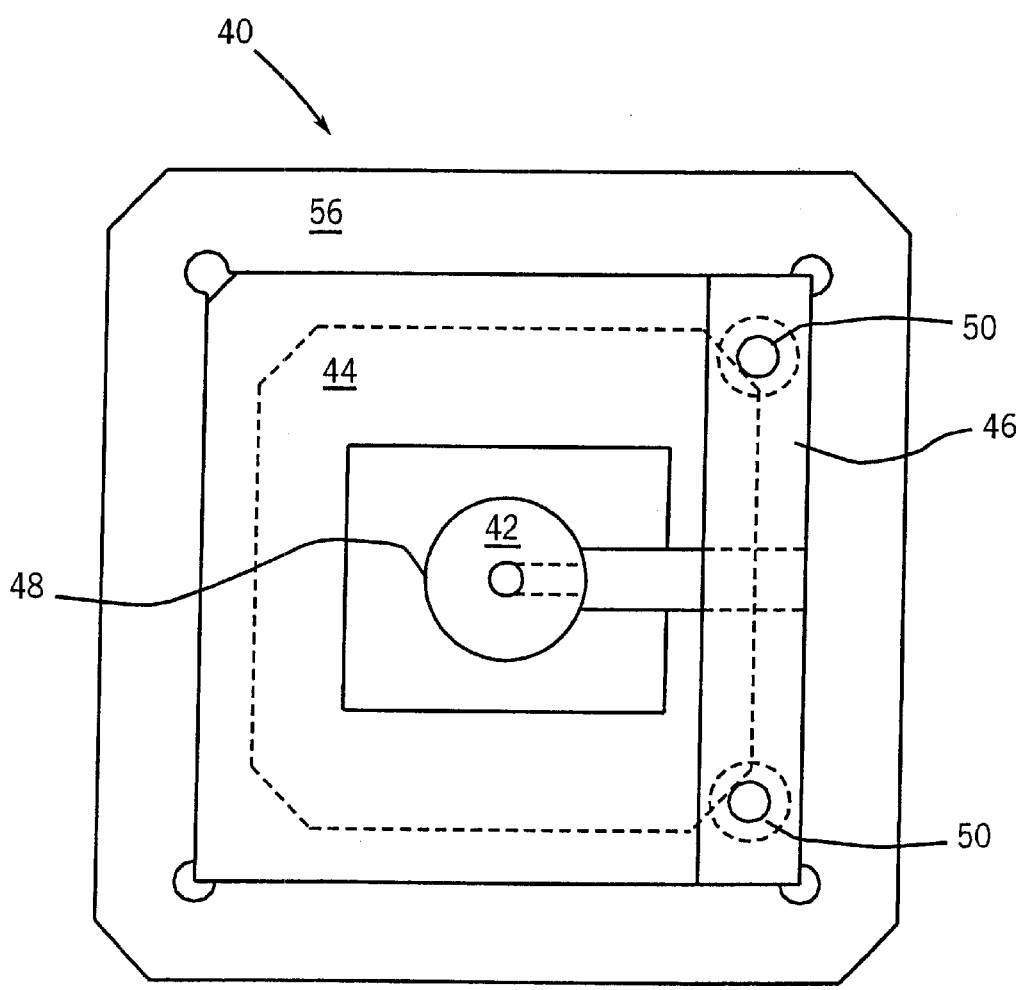

FIG. 5 illustrates a front view and a top view of jig assembly 43. Jig assembly 40 may be larger or smaller depending upon the particular application.

In operation, jig assembly 40 is positioned in place of integrated circuit 20 (FIG. 1) in test device 10. Actuator 18 lowers thermal head 12 until thermoelectric cooler 24 and/or thermocouple sensor 28 is in thermal contact with conductive member 42. A calibration routine can then be performed on thermocouple sensor 28. For example, test control circuit 16 can apply a predetermined current through thermoelectric cooler 24 and sense the temperature of thermocouple sensor 28 via bus 30. A thermometer can be coupled to conductive member 42 through a test thermocouple wire or other conductive wire to measure a temperature of conductor 42.

Thus, it can be seen that jig assembly 40 allows calibration of thermocouple sensor 28 without the need for removing thermocouple sensor 28 from thermal head 12. This contributes greatly to the ease of operation of thermocouple calibration. Accordingly, alternative jig assemblies or other positioning devices may be used in place of jig assembly 40. For example, a simple jig assembly might include only a base material having a recess configured to hold a test thermocouple wire. This alternative embodiment would comprise only two simple pieces: the base material and the test thermocouple wire. Other configurations will be apparent to those of ordinary skill in the art.

Figure 6:
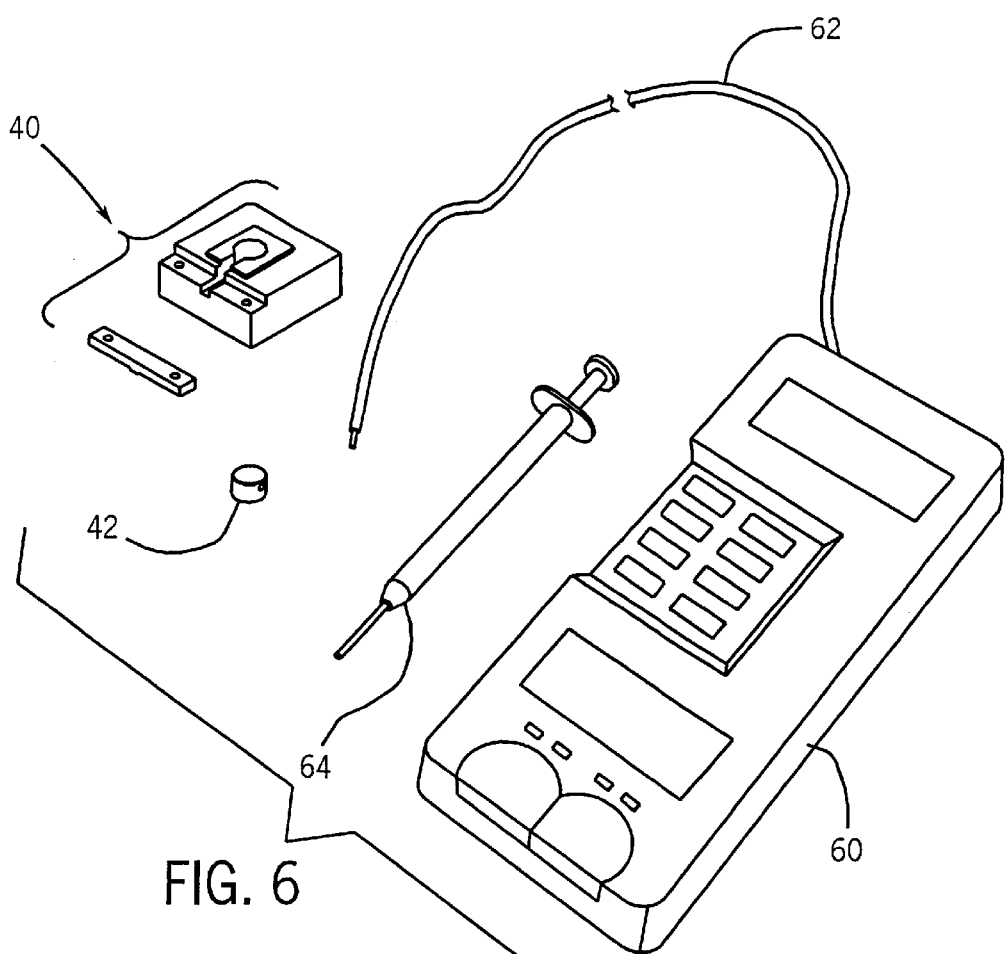
FIG. 6 is a drawing of several parts used to calibrate a thermocouple sensor according to an exemplary embodiment.

Referring now to FIG. 6, a plurality of elements for calibrating thermocouple sensor 28 are shown. Jig assembly 40 is shown in its disassembled form. A thermometer 60 (e.g., a digital thermometer) is coupled to a test thermocouple wire 62, which is a "K"-type thermocouple wire in this exemplary embodiment. Thermocouple wire 62 is coupled to conductive member 42 (e.g., a copper disc). Further, a syringe 64 is provided, the use of which will be described hereinafter.

Figure 7A:
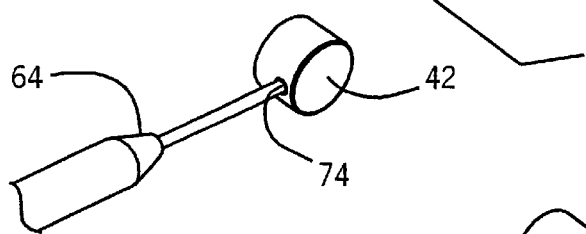
Figure 7B:
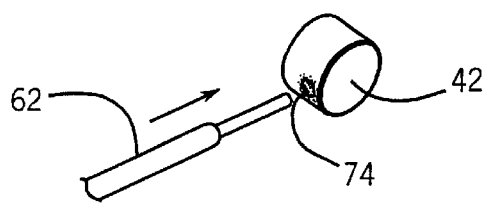
Figure 7C:
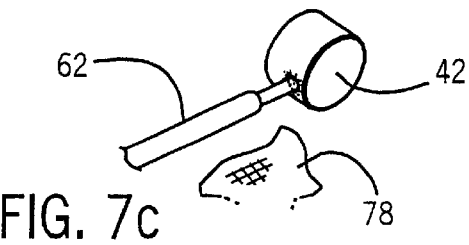

Referring now to FIGS. 7–9, a method of assembling jig assembly 40 according to an exemplary embodiment is shown. In FIG. 7a, syringe 64 is filled with heat sink compound. Heat sink compound is applied from the syringe into a recess 74 (e.g., an aperture) in conductive member 42. Recess 74 is filled until heat sink compound overflows out of recess 74. In FIG. 7b, a "K"-type test thermocouple wire 62 is inserted into recess 74. In FIG. 7c, tissue 78 is used to clean off excedss heat sink compound around thermocouple wire 62 and conductive member 42. In FIG. 8a, conductive member 42 is assembled with holder 44. In FIG. 8b, fastener 46 having a grooved side 84 is assembled with holder 44, with grooved side 84 facing downward. In FIG. 8c and FIG. 8d, fastener 46 is pressed down firmly against holder 44 and two 4/40 screws are used to fasten fastener 46 to holder 44. In FIG. 9a and FIG. 9b, the screws are tightened to lock conductive member 42 in position, making sure that conductive member 42 fits properly within holder 44. A piece of tissue 94 is used to clean off excess heat sink compound on holder 44 to avoid getting heat sink compound on thermal head 12 during calibration.

Figure 10A:
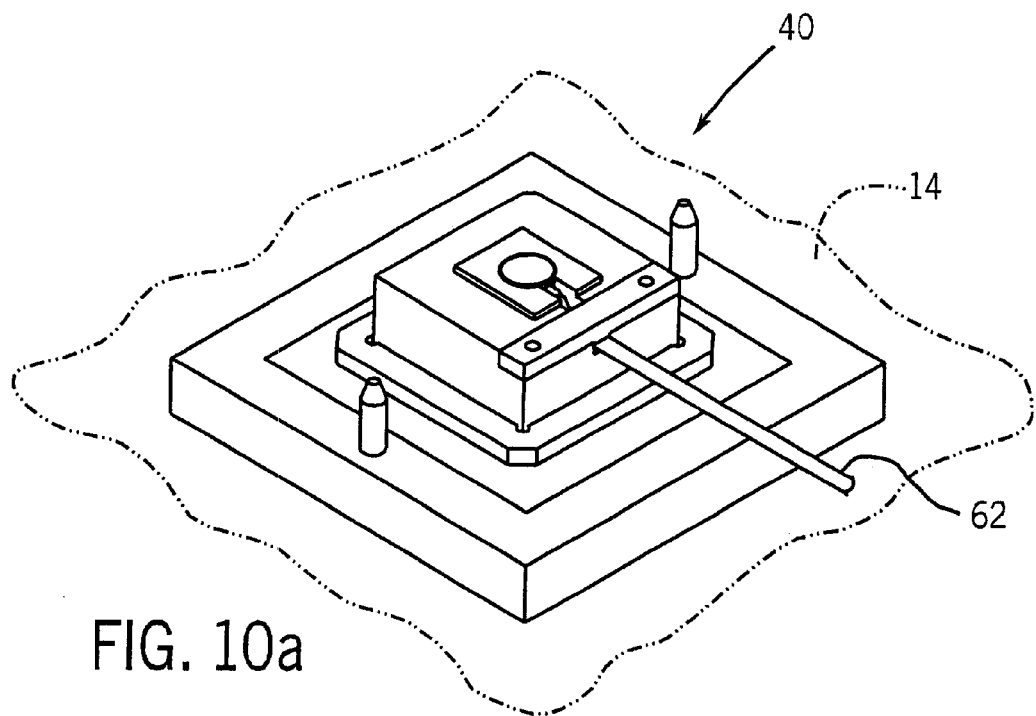
FIGS. 10A–10B shows drawings of steps for calibrating a thermocouple sensor according to an exemplary embodiment.
Figure 10B:
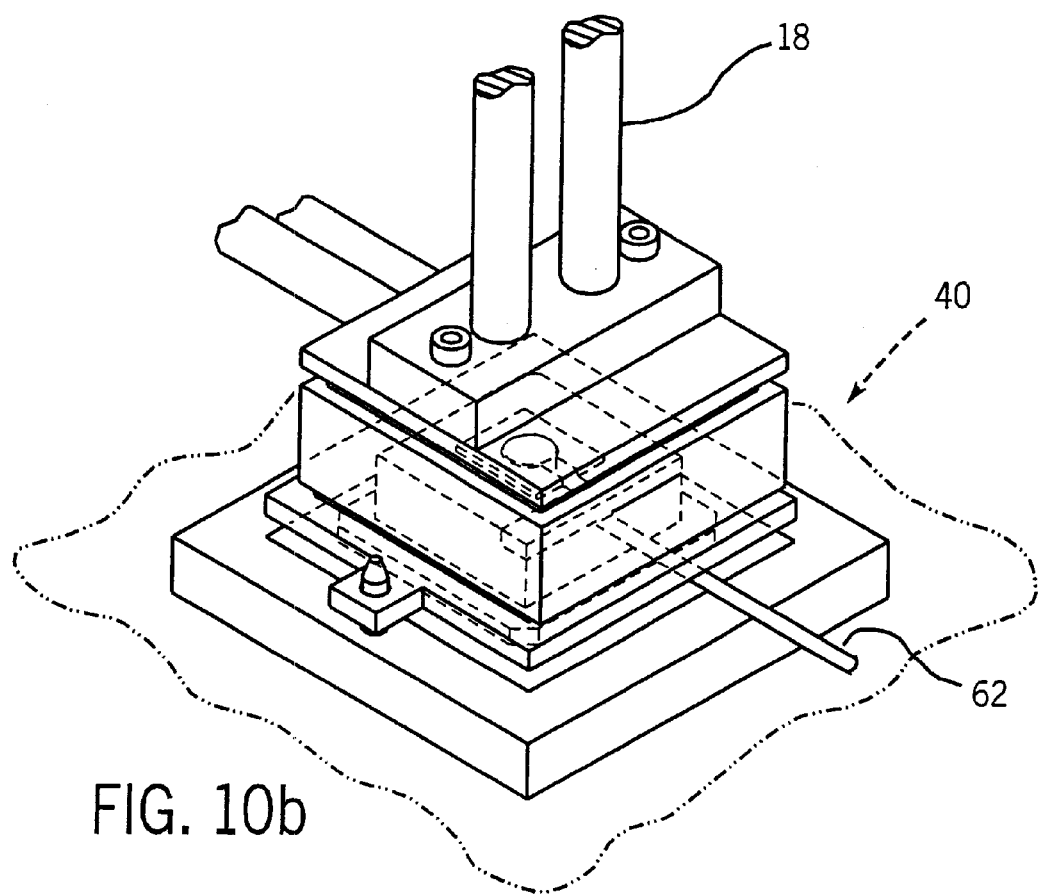
Figure 11A:
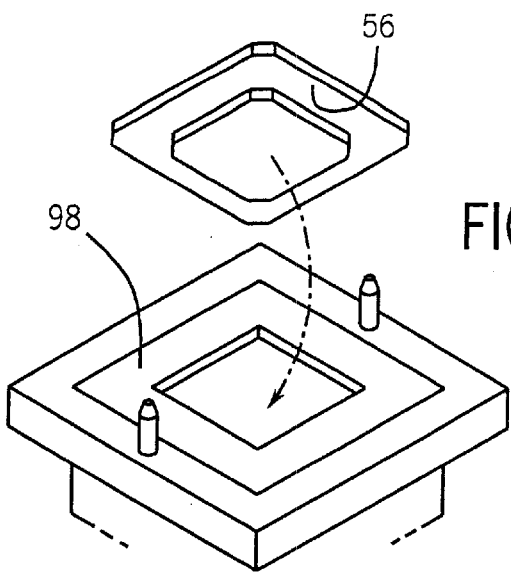
FIGS. 11a–11d shows drawings of steps for calibrating a thermocouple sensor according to an alternative embodiment.
Figure 11B:
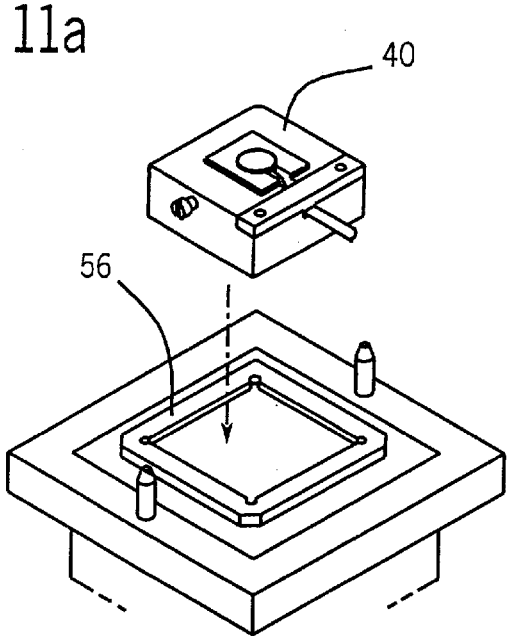
Figure 11C:
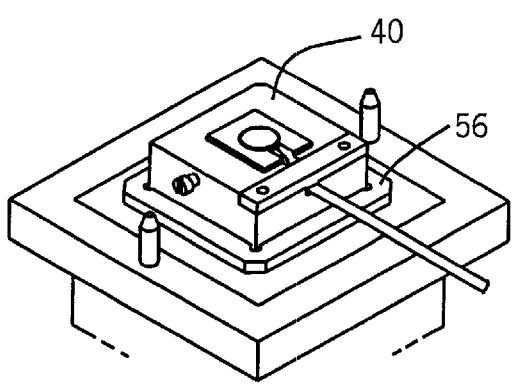
Figure 11D:
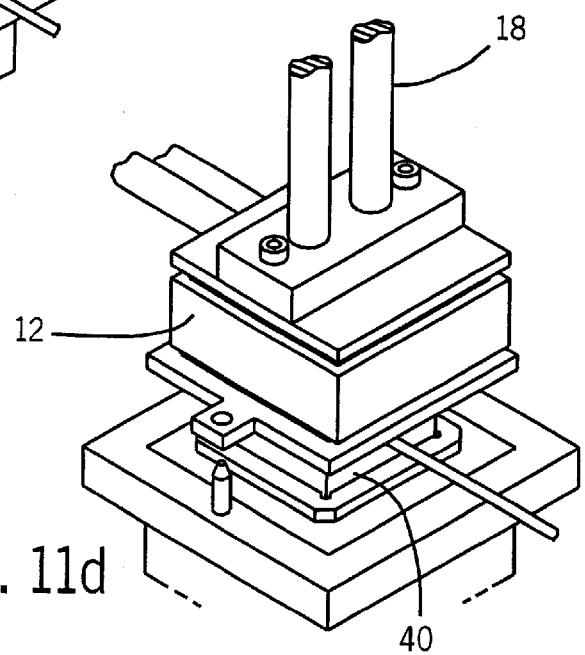

Referring now to FIG. 10, exemplary steps in calibrating thermocouple sensor 28 are shown. An assembled jig assembly 40 is placed on test pad 14 with thermocouple wire 62 coupled to thermometer 60 (not shown in FIG. 10). Actuator 18 is moved automatically or manually to press thermal head 12 down onto jig assembly 40. Next, a calibration procedure is performed on thermocouple sensor 28. The calibration procedure may be as simple as receiving a test signal representative of the temperature of thermocouple wire 62, or may include multiple steps, such as applying various temperatures via thermoelectric cooler 24 to thermocouple sensor 28 and sensing each temperature via thermocouple wire 62 at thermometer 60. The temperature sensed by thermometer 60 may be provided on a display (e.g., a liquid crystal display, a light-emitting diode display, etc.) or provided via a series of audible tones.

According to one exemplary embodiment, the AMD 613-60150 calibration procedure is used. First, thermoelectric cooler 24 is set to a temperature setpoint of 100 degrees C. by test control circuit 16 using a proportional-integral-derivative (PID) control algorithm. Next, actuator 18 is moved to bring thermocouple sensor 28 in contact with conductive member 42 of jig assembly 40. Next, a sufficient time is allowed for the temperature sensed by thermometer 60 to stabilize and for the temperature provided by the PID controller of test control circuit 16 to stabilize. The readings of thermometer 60 and control circuit 16 are recorded and an error is calculated. Next, the offset of control circuit 16 is changed by the error E (i.e., new offset=E+previous offset). With the new offset, the temperatures are again allowed to stabilize and the readings are again taken. The offset is again updated, if necessary. The temperature setpoint is then changed to 60 degrees C. by test control circuit 16 for verification purposes. The offset is adjusted as described above if needed. If the error at 100 degrees is greater than +/−2 degrees C., further adjustment is required. If the error at 60 degrees is greater than +/−3 degrees C., further adjustment is required.

Referring now to FIG. 11, steps for calibrating a sensor according to an alternative embodiment are provided. In this alternative embodiment, adapter plate 56 is utilized to adapt base portion 54 of jig assembly 40 for use with a test pad having an alternative configuration, namely, a test configuration for an Athlon PGA package microprocessor. In FIG. 11a, adapter plate 56 is shown being placed on a test pad 98 suitable for an Athlon PGA package testing process. Jig assembly 40 is provided within adapter plate 56, as shown in FIGS. 11b and 11c. In FIG. 11d, actuator 18 is used to move thermal head 12 downward and in thermal contact with jig assembly 40. Next, a calibration procedure is executed.

Figure 12A:
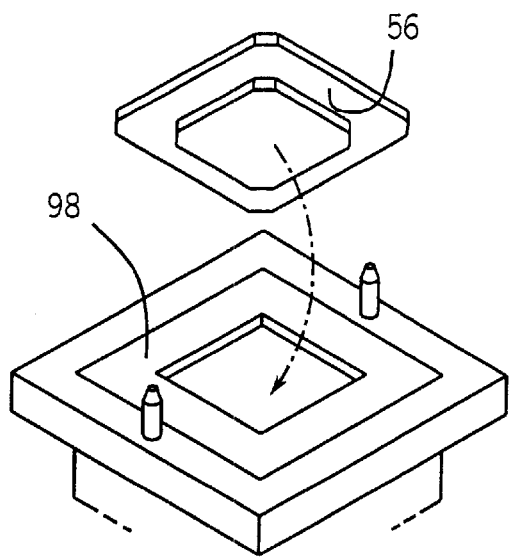
FIGS. 12a–12c and 13a–13c show drawings of steps for calibrating a thermocouple sensor according to yet another alternative embodiment.
Figure 12B:
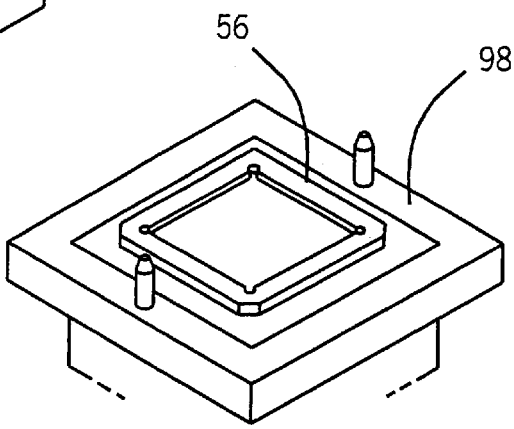
Figure 12C:
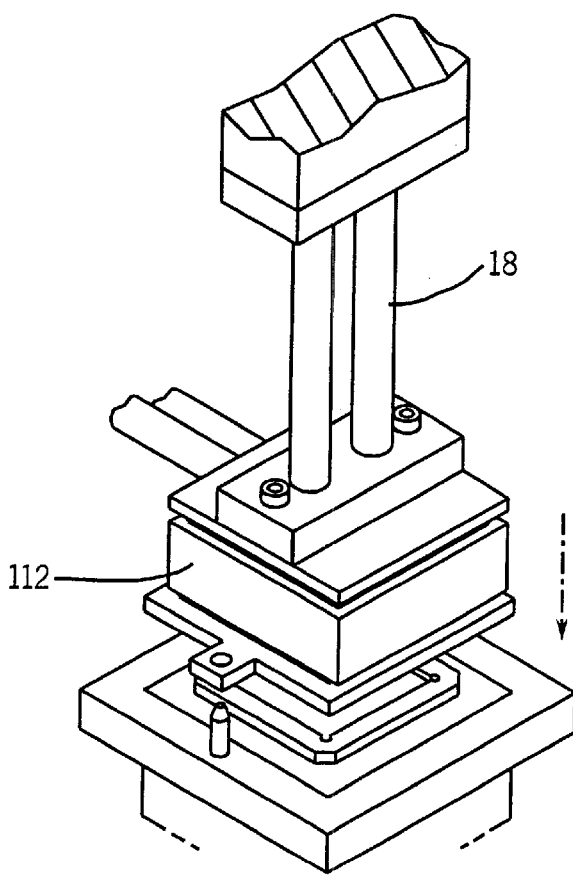
Figure 13A:
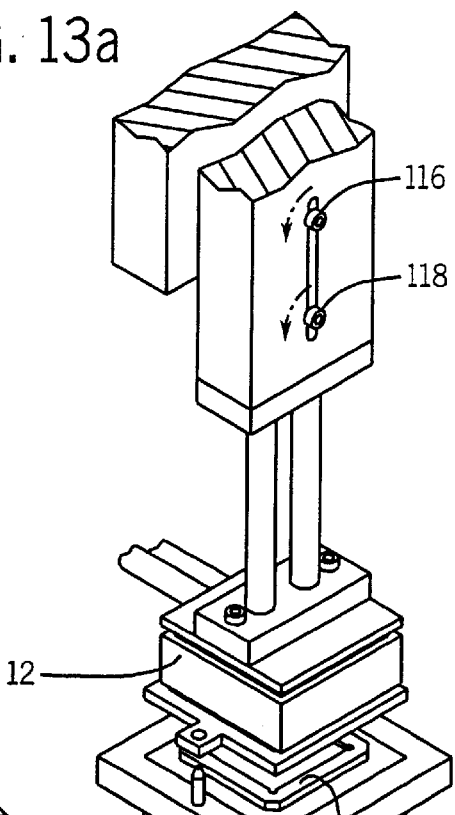
Figure 13B:
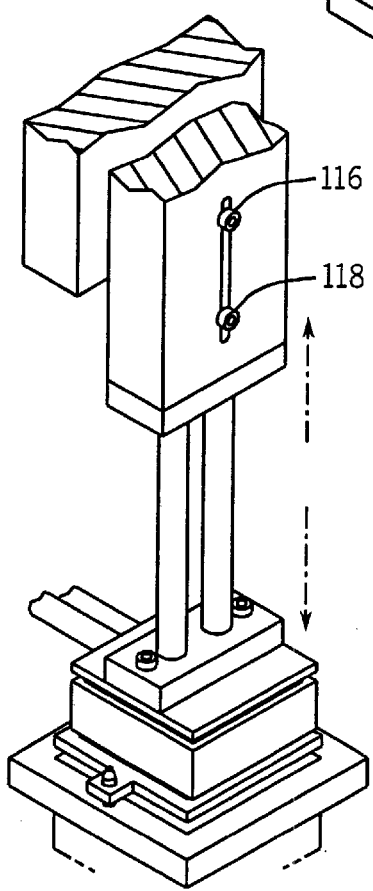
Figure 13C:
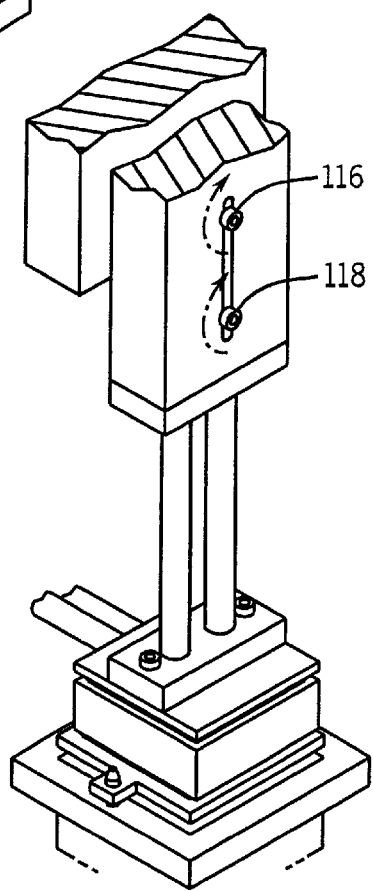

Adapter plate 56 may further serve a second function, namely, as a height-adjustment plate to calibrate the end stroke of actuator 18 for the Athlon PGA package. As shown in FIGS. 12 and 13, in FIGS. 12a and 12b, adapter plate 56 is provided on the Athlon PGA test socket 98. In this embodiment, actuator 18 is a pneumatic cylinder. Next, the air supply to the cylinder in actuator 18 is turned off so that the cylinder can be moved manually. At FIG. 12c, a cylinder mounting plate 112 is moved downward by hand. In this exemplary embodiment, test device 10 is a System Level Test (SLT) Machine, manufactured by Zen Voce Manufacturing Pte. Ltd. In FIG. 13a, the nuts 116 and 118 are loosened to allow the cylinder to move vertically. Using one hand, the top section of the cylinder is moved up while simultaneously, using the other hand, the cylinder mounting is pressed down until thermal head 12 contacts adapter plate 56. In FIGS. 13b and 13c, nuts 116, 118 are tightened again and the air supply is turned on to the cylinder. Thus, the size of adapter plate 56 allows adapter plate 56 to be used to calibrate the pneumatic cylinder height of test device 10. The size of adapter plate 56 is determined based on the ceramic thickness and die thickness of integrated circuit 20, and the compression distance of the pins between test pad 14 and IC 20. These pins may be Pogo contact probes, such as those manufactured by Zen Voce Manufacturing Pte. Ltd. under model number ZV100988S, or contact probes, fuzz buttons, etc. Thus, the adapter thickness equals the ceramic thickness plus the die thickness minus the Pogo pin compression distance. According to one exemplary embodiment, adapter plate 56 is approximately 2.10 millimeters (mm) +/−0.05 mm.

An improved system and method for calibrating a thermocouple sensor attached to a test device has been shown and described, along with various exemplary embodiments and teachings. This new design reduces human wrist and finger fatigue, improves the quality of the process, maintains low cost and low maintenance, and reduces the downtime associated with calibrating a thermocouple sensor since the sensor need not be dismounted from the thermal head. According to one exemplary embodiment, jig assembly 40 is a stand-alone mechanical jig. This new design provides a simple and cost-effective method of calibrating the thermocouple sensor which is located on the surface of thermal head 12.

While the exemplary embodiments illustrated in the FIGS. and described above are presently preferred, it should be understood that these embodiments are offered by way of example only. For example, while jig assembly 40 has been described in detail, it is understood that alternative jig configurations may be used which do not include assembled parts, multiple parts, or the shapes and sizes disclosed with respect to the specific exemplary embodiment. Jig assembly 40 may simply be a one-piece unit having a base suitable for positioning on a test pad and a structure or recess for housing or holding a thermometer or thermocouple wire. While the exemplary embodiments have been disclosed with reference to microprocessors, other integrated circuit test systems requiring a thermocouple sensor may find applications for the teachings disclosed herein. Accordingly, the present invention is not limited to a particular embodiment, but extends to various modifications that nevertheless fall within the scope of the appended claims.

What is claimed is:

1. A jig assembly for use in calibrating a thermocouple sensor, comprising:

a conductive member having a recess configured to receive a thermocouple test wire and a test surface configured for thermal contact with the thermocouple sensor;

a holder having a recess adapted to receive the conductive member; and a fastener coupleable to the holder, wherein the holder and fastener form a recess configured to receive the test wire and the fastener contacts the test wire, wherein the holder and fastener apply a holding pressure to hold the test wire in place.

2. The jig assembly of claim 1, further comprising the test wire, wherein the test wire is coupled to the conductive member, wherein the test wire is a thermocouple sensor.

3. The jig assembly of claim 1, wherein the conductive member is comprised of a first material, the holder is comprised of a second material, and wherein the thermal conductivity of the first material is higher than the thermal conductivity of the second material.

4. The jig assembly of claim 1, wherein the holder includes a base portion configured for mounting to a test pad of an integrated circuit testing machine.

5. The jig assembly of claim 4, further comprising an adapter plate having a recess configured to receive the base portion and an adapter plate base portion configured for mounting to a second test pad of a different configuration than the first test pad.

6. The jig assembly of claim 1, wherein the conductive member is a conductive disc.

7. The jig assembly of claim 6, wherein the holder includes a disc-shaped recess.

8. A jig assembly for use in calibrating a thermocouple sensor, comprising:

a conductive member having a recess configured to receive a thermocouple test wire and a test surface configured for thermal contact with the thermocouple sensor;

a holder adapted to receive the conductive member, wherein the holder includes a base portion configured for mounting to a test pad of an integrated circuit testing machine;

a fastener coupleable to the holder, wherein the holder and fastener form a recess configured to receive the test wire; and an adapter plate having a recess configured to receive the base portion and an adapter plate base portion configured for mounting to a second test pad of a different configuration than the first test pad.

9. The jig assembly of claim 8, wherein the holder and fastener provide a clamping force to hold the test wire in place.

10. The jig assembly of claim 8, further comprising the test wire, wherein the test wire is coupled to the conductive member, wherein the test wire is a thermocouple sensor.

11. The jig assembly of claim 8, wherein the conductive member is comprised of a first material, the holder is comprised of a second material, and wherein the thermal conductivity of the first material is higher than the thermal conductivity of the second material.

12. The jig assembly of claim 8, wherein the conductive member is a conductive disc.

13. The jig assembly of claim 12, wherein the holder includes a disc-shaped recess.

14. A jig assembly for use in calibrating a thermocouple sensor, comprising;

conductive means for thermally contacting the thermocouple sensor, the conductive means further comprising means for receiving a thermocouple test wire;

holder means having a recess for receiving the conductive means; and fastener means coupleable to the holder means and in contact with the test wire for applying a holding pressure to hold the test wire in place.

15. The jig assembly of claim 14, further comprising the test wire, wherein the test wire is coupled to the conductive means, wherein the test wire is a thermocouple sensor.

16. The jig assembly of claim 14, wherein the conductive means is comprised of a first material, the holder means is comprised of a second material, and wherein the thermal conductivity of the first material is higher than the thermal conductivity of the second material.

17. The jig assembly of claim 14, wherein the holder means includes means for mounting to a test pad of an integrated circuit testing machine.

18. The jig assembly of claim 17, further comprising adapter means for receiving the holder means and for mounting to a second test pad of a different configuration than the first test pad.

19. The jig assembly of claim 14, wherein said conductive means includes a conductive disc.

20. The jig assembly of claim 19, wherein the holder means includes a disc-shaped recess.

* * * * *